(12) United States Patent
Hinnen et al.

(10) Patent No.: US 9,841,595 B1
(45) Date of Patent: Dec. 12, 2017

(54) ELECTROWETTING ELEMENT WITH REFLECTIVE SURFACE

(71) Applicant: Amazon Technologies, Inc., Seattle, WA (US)

(72) Inventors: Karel Johannes Gerhardus Hinnen, Eindhoven (NL); Gerben Boon, Roermond (NL); Cristina Maria Petcu, Eindhoven (NL); Tulasi Sridhar Reddy Guntaka, Eindhoven (NL); Erno Langendijk, Eindhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/754,029

(22) Filed: Jun. 29, 2015

(51) Int. Cl.
  G02B 26/00 (2006.01)
  G02B 26/08 (2006.01)
  G02F 1/29 (2006.01)

(52) U.S. Cl.
  CPC .................... G02B 26/005 (2013.01)

(58) Field of Classification Search
  CPC ...... G02B 26/005; G02B 3/14; G02B 26/004; G02B 1/06; G02B 5/003; B01F 3/0807; B01F 13/0071; B01F 13/0076; B01F 13/0062; B01F 5/0646; B01F 5/0653; C40B 40/04; C40B 50/08; C40B 30/04; C40B 60/08; C40B 60/12; C40B 70/00; C40B 60/10

USPC ........ 359/237, 242, 265–267, 273–275, 315, 359/321, 290–292, 295, 296, 298
See application file for complete search history.

(56) References Cited

U.S. PATENT DOCUMENTS

| | | | |
|---|---|---|---|
| 2012/0242565 A1* | 9/2012 | Noh ..................... | G02F 1/167 345/107 |
| 2014/0285869 A1* | 9/2014 | Giraldo ................ | G02B 26/005 359/290 |
| 2016/0178892 A1* | 6/2016 | De Greef ............. | G02B 26/005 345/589 |
| 2016/0282605 A1* | 9/2016 | Petcu ..................... | G02B 1/04 |

OTHER PUBLICATIONS

Hecht, E.—Optics, 4th Edition (2001) Chapter 9, Interference pp. 385-442.

* cited by examiner

Primary Examiner — Brandi Thomas
(74) Attorney, Agent, or Firm — EIP US LLP (57) ABSTRACT

An electrowetting element comprises a first fluid and a second fluid immiscible with the first fluid. A support plate includes a support plate surface in contact with at least one of the first or second fluids. The support plate includes an electrode for applying a voltage to control a configuration of the first and second fluids and a reflective surface. A first layer positioned between the reflective surface and the support plate surface has a first layer optical thickness substantially equal to a quarter multiple of a reference wavelength.

19 Claims, 4 Drawing Sheets

ELECTROWETTING ELEMENT WITH REFLECTIVE SURFACE

BACKGROUND

Electrowetting display devices are known. In an off state of a picture element of an example of such a device an oil layer covers a display area. In an on state the oil layer is retracted so as to cover less of the display area. To switch the picture element to the on state a voltage is applied via an electrically conductive fluid and an electrode, the conductive fluid being immiscible with the oil. To switch the picture element to the off state, the voltage is switched off.

In reflective electrowetting display devices, incident light is reflected to provide a display effect. It is desirable to improve a performance of such a reflective electrowetting display device.

DETAILED DESCRIPTION

Figure 1:
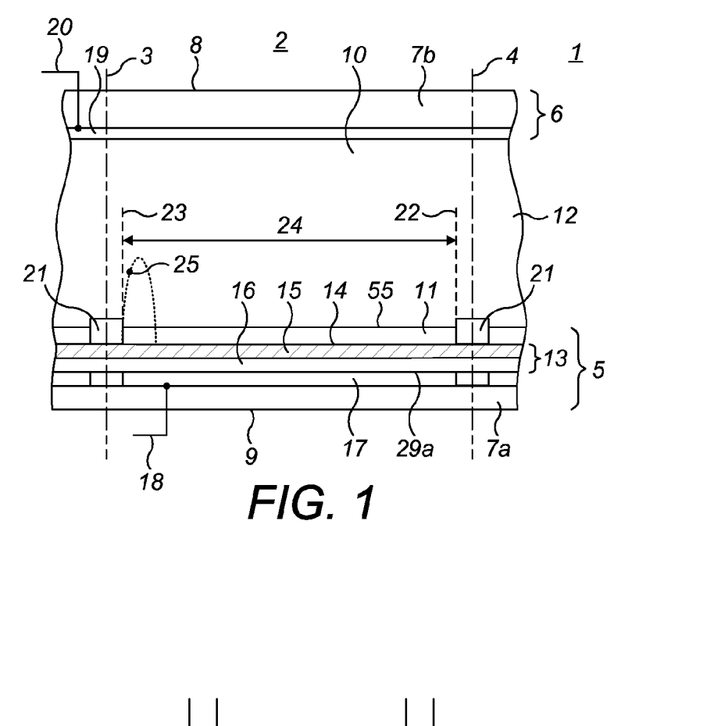
FIG. 1 shows schematically an example electrowetting element.

FIG. 1 shows a diagrammatic cross-section of part of an example of an electrowetting display device 1, including a plurality of picture elements, electrowetting pixels, electrowetting cells, electrowetting elements, pixels or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side 8; alternatively, in other examples, a surface of the first support plate may define the viewing side. The display device may be of the reflective or transflective type. The display device may be an active matrix driven or a direct drive display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two fluids. In the example of FIG. 1, the space 10 is filled with a first fluid 11 and a second fluid 12, at least one of which may be a liquid. The second fluid is substantially immiscible with the first fluid. Therefore, the first fluid and the second fluid do not substantially mix with each other and in some examples do not mix with each other to any degree. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 25 for when a voltage is applied, which interface defines a boundary between the volume of the first fluid and the volume of the second fluid; this interface or boundary may be referred to as a meniscus. The location and shape of the interface between the first fluid and the second fluid in examples is determined by the applied voltage. The thickness of the first and second fluid layers in FIG. 1 is shown as an example; in other examples, the first and/or second fluid layers may have different thicknesses.

The second fluid of the device is at least one of electrically conductive or polar, for example the second fluid is electrically conductive, polar, or both, and may be water, or a salt solution such as a solution of potassium chloride in water. The second fluid may be transparent; it may instead be coloured, for example, or absorbing. The first fluid of the device, which is electrically non-conductive, may for example include an alkane like decane or hexadecane, silicone oil or decalin (otherwise known as bicyclo-4,4,0-decane).

Typically, electrically conductive is for example that the second fluid is capable of conducting electricity; for example an electrical current may flow through the second fluid due to the flow of ions through the second fluid. Typically, polar is for example that the second fluid comprises at least one compound (for example a liquid vehicle) having a molecule with a net dipole, for example that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond.

The first fluid may absorb at least a part of the visible spectrum. The first fluid may be transmissive for a part of the visible spectrum, forming a colour filter. For this purpose the first fluid may be coloured by addition of pigment particles or a dye. Alternatively, the first fluid may be black, for example by absorbing substantially all parts of the visible spectrum, or reflecting. A reflective first fluid may reflect the entire visible spectrum, making the layer appear white, or part of it, making it have a colour. In examples, the first fluid is black and therefore absorbs substantially all parts of the optical spectrum, for example in the visible light spectrum. Typically, a given spectrum of optical light may include a degree of variation, therefore the first fluid may not absorb all wavelengths, but the majority of wavelengths within the given spectrum so as to perform the function of the first fluid in the element. The first fluid may therefore be configured to absorb substantially all light incident on the first fluid. For example the first fluid may absorb 90% or more of light in the visible spectrum and incident on the first fluid.

The first support plate 5 may include an insulating layer 13. The insulating layer may be transparent, for example fully transparent, for example transmissive at least to visible light. The insulating layer 13 may extend between walls of a display element. To avoid short circuits between the second fluid 12 and electrodes 17 arranged under the insulating layer, layers of the insulating layer may extend uninterrupted over a plurality of display elements 2, as shown in the Figure. The insulating layer has a surface 14 facing, for example closest to, the space 10 of the display element 2. The thickness of the insulating layer may be less than 2 micrometers and may be less than 1 micrometer; for example the insulating layer may be 150 nanometers or less in thickness.

The insulating layer in examples described herein is for example formed of a contact layer 15 in contact with a fluid, which is for example formed of a hydrophobic material such as Teflon AF1600®, and a barrier layer 16 with predetermined dielectric properties, the contact layer 15 facing, for example being closer to, the space 10, as shown in the Figure. The barrier layer 16 in examples is formed of one layer or a plurality of layers, as will be described in more detail below. The barrier layer 16 may have a thickness, taken in a direction perpendicular to the plane of the substrate, of between 50 nanometers and 500 nanometers.

In the absence of an applied voltage, for example with the applied voltage being a zero voltage, the first fluid 11 adheres preferentially to the surface of the insulating layer 13 for adjoinment by the first fluid, since the surface for adjoinment by the first fluid has a higher, for example greater, wettability for the first fluid than for the second fluid; the surface may therefore be hydrophobic. As will be explained, with the applied voltage being a non-zero voltage or a driving voltage, the surface has a higher wettability for the second fluid than for the first fluid; for example the surface with the applied non-zero voltage may be considered to be hydrophilic. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per display element; in other examples there may be more than one electrode per display element. The electrode 17 is electrically insulated from the first and second fluids by the insulating layer 13; electrodes of neighbouring display elements are separated by a nonconducting layer, although in other examples electrodes of one or more neighbouring display elements may be electrically connected. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The second support plate 6 for example includes a second electrode 19, which may extend between walls of a display element, and/or be disposed, for example located, above and/or covering or overlapping the walls of the display element and/or extend uninterruptedly over a plurality of display elements 2, as shown in the Figure. The electrode 19 is in electrical contact with the second fluid 12 and is common to all display elements. The electrode may comprise, for example the transparent conductive material indium tin oxide (ITO) though other examples are described below. A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7a. The signal lines 18 and 20 are coupled to a display driving system.

The first fluid 11 in this example is confined to a display element by at least one wall, in this example walls 21, that follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be part of a surface layer of the support plate that repels the first fluid, such as a hydrophilic or less hydrophobic layer. The walls may extend from the first to the second support plate but may instead extend partly from the first support plate to the second support plate as shown in FIG. 1. Although in FIG. 1 the walls are indicated as being part of the first support plate 5, in other examples the walls may not be considered part of the first support plate 5.

The extent of the display element, indicated by the dashed lines 3 and 4, is defined by the centre of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the first and second fluids adjoin, in other words contact, the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
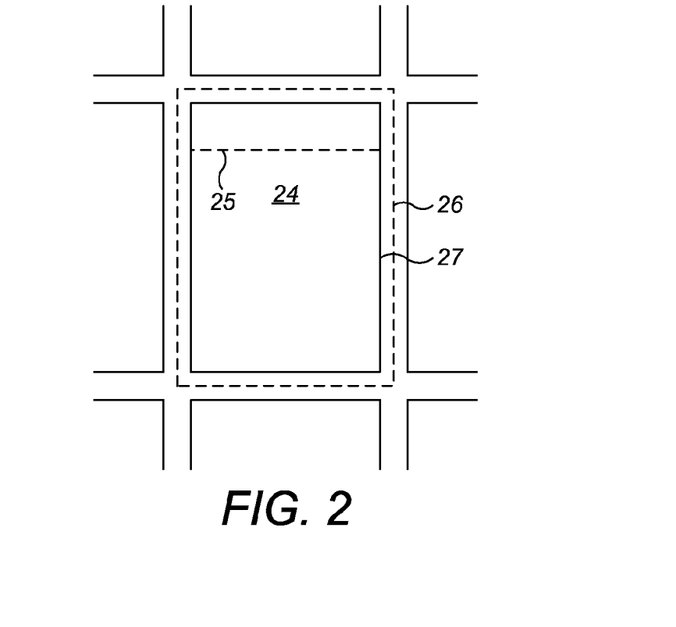
FIG. 2 shows schematically a plan view of the example electrowetting element of FIG. 1.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied the fluid 11 forms a layer between the walls 21, as shown in FIG. 1. Application of a voltage will cause the second fluid to displace the first fluid, to contract, for example retract, the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element. This display effect determines the display state an observer will see when looking towards the viewing side of the display device. The display state can be from black to white with any intermediate grey state; in a colour display device, the display state may also include colour.

In either of reflective and transreflective examples of display element 2, the insulating layer 13 may be transparent and support plate 5 includes a reflective surface 29a. Reflective surface 29a is operable to redirect incident light in the direction of the support plate surface 14. In the example of FIG. 1, reflective surface 29a is a surface of the electrode 17. Electrode 17 may include a substantially metallic surface (for example of 90%, 95% or greater than 95% being metallic), an alloy, a doped metal, or a dielectric reflector. Electrode 17 may include, for example be formed of, at least one of: aluminium, silver, gold, copper, nickel, platinum, rhodium, lanthanum, silicon, or any other suitable material known to those of skill in the art. For example, electrode 17 may be an alloy including aluminium with copper or nickel. In further examples, however, electrode 17 may be disposed on an additional reflective layer (not shown) different from the electrode, and reflective surface 29a may be a surface of that reflective layer. For example, electrode 17 may comprise transparent conductive material such as indium tin oxide (ITO), and reflective layer 29a may comprise a metallic material such as those described above. In examples, electrode 17 may be formed as a single layer or built up from several layers of conductive materials. In some such examples, the electrode layer separate from the reflective layer may be the first layer described in examples herein. Further, between the reflective surface and the electrode, there may be one or more further layers which for example include an electrical insulating material or electrical circuitry for connecting the electrode to a control system.

Light incident on support plate surface 14 that is transmitted through the insulating layer 13 may be reflected at the reflective surface 29a back towards the support plate surface 14. In addition, light incident on support plate surface 14 may further be reflected at any of the surfaces of the individual layers composing insulating layer 13; for example light may be reflected at either of the contact layer 15 or the barrier layer 16. In known systems, when such reflected light includes phase differences at or above a support plate surface, attenuation can occur in the reflected light due to destructive interference. In addition, when the reflecting surface is adjoined by fluid or any layers, the level of absorption of the reflecting surface may be greater than when the reflecting surface is adjoined by air, causing further losses to the reflected light. Examples are now described which reduce such known attenuation due to destructive interference and absorption.

Typically, reflectance is, for example, represented by a ratio of reflected irradiance to incident irradiance upon a surface area. Irradiance may also be known as power, or radiant flux. Reflectance may be determined for a variety of surfaces, materials, and material thicknesses. For some materials, reflectance may be dependent on wavelength and angle of the incident light. In examples, reflectance may be determined for a single layer, film, or media, including a single surface upon which light may be reflected or from which light may emerge. Alternatively, reflectance may be determined for a stack of layers at an outside surface of the stack, for example a stack of thin films, characterizing a combination of both the light reflected at the outside surface of the stack and the light reflected at multiple surfaces within the stack. The characterization of reflectance may include first order reflections, or the characterization may include second, third, and higher-order reflections as well, as will be understood by those of skill in the art.

Materials may exhibit different reflectance at different geometric layer thicknesses, for example a different reflectance for a layer which is dimensionally thicker or thinner than a different layer. Reflectivity typically describes, for example, the limit value of reflectance for a sufficiently geometrically thick reflecting material. For example, a layer of aluminium may have a reflectance of 0.19 at a thickness of 4 nm for a wavelength of 300 nm, but reaches its limit value reflectance R (which may then be alternatively referred to as the reflectivity) of 0.92 as measured with the aluminium in air at a thickness of 50 nm.

Figure 3A:
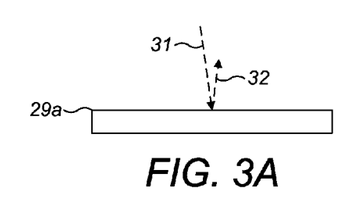
FIG. 3A shows schematically an example of reflectivity of a reflecting surface.

FIG. 3A depicts an example reflective surface 29a. In the example, the reflective surface 29a is a surface of electrode 17. A ray of incident light 31 is directed to the reflective surface 29a. In examples, the ray of incident light 31 may include a target wavelength band of radiation over which it is desirable to increase the reflectance of the support plate. Typically, the target wavelength band may be in the visible range. For example, the target wavelength band may represent red, blue, green, white, or any other spectral combination known to those of skill in the art. In examples, the target wavelength band may be optimized to increase the reflectance of a display device over a region where the human eye sensitivity is the greatest. By selecting a target wavelength band over which the reflectance of the support plate is increased, it may be possible to provide a support plate with improved reflectance in the target wavelength band, thereby providing a desired colour effect or brightness increase. For example, the support plate with an increased reflectance for a particular colour may act as a colour filter and may even obviate in some examples using a colour filter in the second support plate.

The target wavelength band may include a reference wavelength that may be used to select a geometric thickness of one or more layers within the insulating layer 13 that will cause constructive interference for the target wavelength band, as will be further described below. For example, the reference wavelength may be a central wavelength of the target wavelength band, for example a wavelength which is approximately midway between a minimum and a maximum wavelength of the target wavelength band. In examples, the reference wavelength may include a central wavelength of a peak of an eye sensitivity function, or luminous efficiency function, as will be understood by those of skill in the art. For example, the reference wavelength may be 550 nm. In further examples, the reference wavelength may include a band of radiation that represents a subsection of the target wavelength band.

In examples, incident light 31 may include an incident angle that is normal or substantially normal, for example approximately 0° or 0° with respect to a normal of the support plate surface 14. In further examples, incident light 31 may have an incident angle included within a field of view of the electrowetting element at the reflective surface 29a. For example, the field of view of the electrowetting element at the reflective surface may include the cone within 45° of the normal of the support plate.

Incident light 31 may reflect off of reflective surface 29a to generate reflected light 32. The reflective surface 29a may have a reflective surface reflectivity that is the ratio of reflected light 32 to incident light 31. In examples, the reflective surface reflectivity may be a feature of the material forming the reflective surface, and may further be dependent on wavelength and/or the angle of incident light. For example, an aluminium surface might have a reflectivity in air between 0.88 and 0.92 for visible light between the incident light angles of 0 to 30°.

Figure 3B:
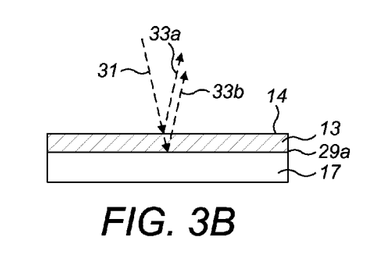
FIG. 3B shows schematically an example of reflectance of an example support plate.

FIG. 3B depicts a ray of incident light 31 on a support plate surface 14. In examples, support plate 5 may include any number or combination of layers, such as insulating layer 13, including contact layer 15 and barrier layer 16, and electrode 17. In this example, the electrode 17 includes reflective surface 29a, and is positioned at the bottom of insulating layer 13. A portion of incident light 31 on support plate surface 14 may be reflected at support plate surface 14 as reflected light 33a. A further portion of incident light 31 may be reflected, by the surface of any layer within the insulating layer 13, or by reflective surface 29a back towards support plate 14, to form reflected light 33b. In examples, reflected light 33a may include first order reflections from layers within insulating layer 13, and in further examples reflected light 33a may include higher order reflections from within insulating layer 13. The combination of reflected light 33b and reflected light 33a at the support plate surface 14 combines to form the total reflected light. The support plate reflectance is, for example, the ratio of light intensity of reflected light 33, for example the sum of light intensity of rays 33a and 33b, to light intensity of incident light 31. In examples, it may be possible to improve the support plate reflectance by selecting the configuration of the support plate 5 stack, as will be described below.

Figure 4:
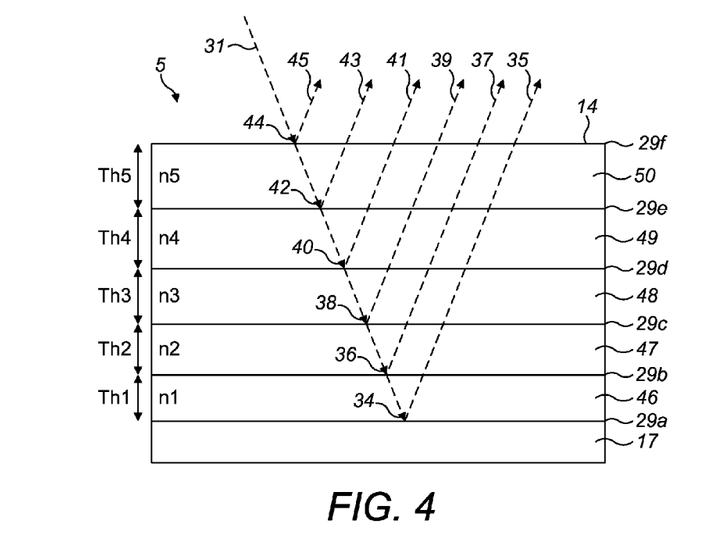
FIG. 4 shows schematically a further example of reflectance of layers within a support plate surface of an example electrowetting element.

Examples of the reflective properties of a plurality of layers for an example support plate of an electrowetting element will now be described with reference to FIG. 4. FIG. 4 depicts a cross section of an example stack of layers 46, 47, 48, 49, and 50. In different examples, layers 46, 47, 48, 49, and 50 may separately represent portions of the contact layer 15, the barrier layer 16, and the electrode 17 that form support plate 5, as will be described in the examples below. Moreover, layers 46, 47, 48, 49, and 50 may be positioned anywhere within a support plate below any portion of the contact layer 15, the barrier layer 16, and the electrode 17. While FIG. 4 depicts 5 layers, this is in no way intended to be limiting. In examples, support plate 5 may have a different number of layers. In examples, layers 46, 47, 48, 49, and 50 may represent thin films each respectively ranging in optical thickness from substantially a quarter of a reference wavelength to ten reference wavelengths.

The materials comprising layers 46, 47, 48, 49, and 50 may be selected to be substantially transmissive, for example transmissive with a sufficiently low absorption, over the target wavelength band. Incident light 31 on the support plate 5 may be reflected, absorbed, or transmitted at each surface of the stack that comprises support plate 5. Incident light 31 includes various components 34, 36, 38, 40, 42, 44 that may be reflected at various surfaces, for example incident light component 34 may be reflected at reflective surface 29a, generating reflected light component 35, incident light component 36 may be reflected at surface 29b, generating reflected light component 37, incident light component 38 may be reflected at surface 29c, generating reflected light component 39, incident light component 40 may be reflected at surface 29d, generating reflected light component 41, incident light component 42 may be reflected at surface 29e, generating reflected light component 43, and incident light component 44 may be reflected at surface 29f, generating reflected light component 45. For the sake of simplicity, only first order reflections are depicted in FIG. 4. This is not intended to be limiting, however, as examples herein contemplate increasing the reflectance of support plate 5 for higher order reflections within support plate 5 as will be described below.

While FIG. 4 depicts incident light components 34, 36, 38, 40, 42, and 44, and reflected light components 35, 37, 39, 41, 43, and 45 at an angle that is not normal to the support plate surface 14, the representation is intended for illustration purposes only and is in no way intended to be limiting. In further examples, incident light components 34, 36, 38, 40, 42, and 44, and reflected light components 35, 37, 39, 41, 43, and 45 may be normal or substantially normal to the support plate surface 14. In further examples, incident light components 34, 36, 38, 40, 42, and 44, and reflected light components 35, 37, 39, 41, 43, and 45 may have any angle of incidence with respect to support plate surface 14.

FIG. 4 depicts the electrode 17, including the reflective surface 29a. In examples, the electrode 17 comprises a metallic material, for example a metal. Support plate 5 includes a first layer 46 disposed on the electrode 17 between the electrode 17 and the support plate surface 14. The first layer is for example transparent or transmissive for light. The first layer 46 includes a first layer surface 29b, a first refractive index $n_1$ and a first layer thickness Th1, the first layer thickness Th1 being a geometric thickness measured in a direction perpendicular to surface 29b. The incident light component 34 on the reflective surface 29a may be substantially reflected back towards the support plate surface 14 as reflected light component 35. The incident light component 36 on first layer surface 29b may further be substantially reflected back towards the support plate surface 14 in reflected light component 37. Typically, substantially reflected light is for example light with a majority being reflected, but with possibly some minority proportion of light absorbed by and/or transmitted through the reflective surface.

First layer 46 has a first layer optical thickness substantially equal to a quarter multiple of the reference wavelength. Thus, the optical thickness is substantially equal to for example an integer multiple, such as 1, 2, 3, 4, 5, 6, 7, 8, 9 or 10, of a quarter of the reference wavelength. Typically, the optical thickness of a medium, for example a transmissive or transparent medium, or optical path length, is the product of a layer geometric thickness and a refractive index of the layer, for example the first layer thickness Th1 and the first refractive index $n_1$. For example, for a reference wavelength of 550 nm, a first layer geometric thickness Th1 of 137 nm, and a first refractive index $n_1$ of 1.3 the first layer optical thickness is 178. Selecting the optical thickness determines the phase delay of reflected light passing back through a layer after reflection.

As will be understood by those of skill in the art, incident light component 34 may experience a phase shift of one half of a wavelength at reflective surface 29a as a result of the interaction of the electromagnetic field in the incident light component 34 with the conducting surface of the reflective surface 29a. Moreover, in known systems, destructive interference in first order and subsequent higher order reflections due to optical path differences may reduce the total reflected irradiance from support plate surface 14. For example, the incident light component 34 must travel through first layer thickness Th1 and reflected light component 35 must also travel through first layer thickness Th1, which in combination is two times first layer thickness Th1 further than the light reflected at first layer surface 29b travels. Because the reflected light component 35 and the reflected light component 37 each travel at different distances and experience different phase shift conditions, it is possible for destructive interference to occur in the total amount of reflected light.

In order to provide for constructive interference of reflected light component 35 and reflected light component 37 at support plate surface 14, the phase of reflected light component 35 is designed in examples described herein to be substantially the same, or within a quarter wavelength of the phase of the reflected light component 37, at support plate surface 14. In order for the phases of the reflected light 35 and 37 to be substantially the same (for example within acceptable variations) at the support plate surface 14, the first layer optical thickness may be substantially equal to a quarter multiple of the reference wavelength. The first layer optical thickness is equal to the first layer geometrical thickness Th1 multiplied by the first layer refractive index. By substantially equal to a quarter multiple of the reference wavelength, the first layer optical thickness may be, for example, a quarter multiple of the reference wavelength plus or minus an eighth of the reference wavelength.

By selecting the first layer optical thickness to be substantially equal to a multiple of a quarter of the reference wavelength, it may be possible to prevent or reduce destructive interference in support plate reflectance which would otherwise occur in a known device, therefore in the present examples providing brighter displays. For example, for a reference wavelength that is in the visible range of light from approximately 200 to 800 nanometers (nm) and a material with a refractive index that is approximately 1.3, the first layer optical thickness may be approximately 65 to 270 nm. For the reference wavelength of 550 nm, the peak of the eye sensitivity function, the first layer optical thickness may be approximately 178 nm, or between 89 and 268 nm.

The example of first order reflectance depicted in FIG. 4 is not intended to be limiting, in further examples there may be additional order reflections wherein a ray of light is reflected more than once before emerging from support plate surface 14. For example, incident light component 34 may be reflected at surface 29a as reflected light component 35, only to be reflected again at the first layer surface 29b (not pictured) back towards reflecting surface 29a, and subsequently reflected back towards the surface of support plate 14 again at surface 29a. The first, second, and higher order light reflection components within the support stack may emerge at the support plate surface 14 to create destructive or constructive interference, as will be understood by those of skill in the art. In examples, the first layer optical thickness may be selected to optimize constructive interference, for example at the support plate surface 14, taking into account the phases of first order, second order, and further higher order reflected light.

As may be understood by those of skill in the art, the reflectance of reflective surface 29a may further be a function of the refractive index $n_1$ of the first layer 46. For example, when the reflective surface 29a comprises aluminium in air having a refractive index of approximately 1, the reflective surface may have a reflectance of 0.92. When the aluminium reflective surface 29a is adjoined by an electrolyte solution having a refractive index of approximately 1.45, however, the reflectance of the reflective surface 29a may drop below 0.89. Therefore, in examples, the first layer 46 may include a first refractive index $n_1$ that is less than 1.6. For example, for a first layer comprising silicon dioxide ($SiO_2$), the first refractive index $n_1$ may be between 1.45 and 1.47 in the visible light spectrum. In further examples, however, other inorganic materials having a low refractive index may be used, for example any of those listed further below.

In examples of support plate 5, a second layer may be included. For example, FIG. 4 further depicts a second layer 47 including a second layer surface 29c. The second layer 47 is disposed on the first layer 46 between the first layer 46 and the support plate surface 14. The second layer is for example transparent or transmissive. The second layer 47 includes a second refractive index $n_2$ and a second layer thickness Th2. The incident light component 38 on the second layer surface 29c may be reflected back towards the support plate surface 14 in reflected light component 39. As those of skill in the art will readily understand, as occurs in known systems, the reflected light component 39 has the potential to be out of phase with, and therefore destructively interfere with reflected light component 35 and reflected light component 37. In order to provide constructive interference, and therefore increase or maximize a reflectance of the support plate, second layer 47 may include in present examples a second layer with thickness Th2 that is substantially equal to a multiple of a quarter of the reference wavelength. By substantially equal to a quarter multiple of the reference wavelength, the second layer optical thickness may be, for example, a quarter multiple wavelength plus or minus an eighth of the reference wavelength. By making the second layer optical thickness substantially equal to a multiple of a quarter of the reference wavelength, there is substantially less phase shift between reflected light components 35, 37 and 39 at or above support plate surface 14. For a reference wavelength that is in the visible range of light from approximately 200 to 800 nm, the second layer optical thickness may be approximately 65 to 260 nm. For the reference wavelength of 550 nm, the second layer optical thickness may be approximately 178 nm, or between 89 and 268 nm.

In further examples, the first layer 46 may include a first refractive index $n_1$, and second layer 47 may include a second layer refractive index $n_2$ that is greater than the first refractive index $n_1$. As will be understood by those of skill in the art, Fresnel's equations provide that incident light will not be phase shifted when transmitted from a high refractive index media to a low refractive index media. Because the second layer refractive index $n_2$ is greater than the first refractive index $n_1$, there is therefore for example no phase shift between incident light component 36 and the reflected light component 37 and the phases of reflected light components 35 and 37 should be the same at or above the support plate surface 14.

As will be further understood by those of skill in the art, Fresnel's equations further provide that the reflectance of a surface adjoined by two layers is proportional to the square of the difference in index of refraction between adjacent layers. In other words, by increasing the gap between the first layer refractive index $n_1$ and the second layer refractive index $n_2$, it may be possible to increase the reflectance of the second layer surface 29b. In examples, the first layer may be a low absorption media. Reflecting more light off the second layer surface 29b may increase the total reflectance of support plate 5 by avoiding the relatively higher absorption at reflective surface 29a. Therefore, in examples, the second layer refractive index $n_2$ may be at least 0.3 greater than the first layer refractive index $n_1$. In some examples, such a difference of at least 0.3 gives at least a useful reflectance. In further examples, however, greater differences between the second layer refractive index $n_2$ and the first layer refractive index $n_1$ may be used, however.

In examples, the first layer may comprise an inorganic material. An inorganic material is, in examples, any material or compound which is not organic. Therefore, an inorganic material or compound may not include carbon or may not include a carbon atom bonded to a hydrogen atom (i.e. a C—H bond). An inorganic material may for example be a crystalline material, for example due to formation using a vapour deposition process such as those described herein. In other examples, an inorganic material may be amorphous. An inorganic material may be considered to comprise atoms which form one or more lattices, for example, with a structure which is crystalline or amorphous.

For example, the first layer may comprise, for example be formed of, one or more of: silicon oxide ($SiO_x$), for example silicon dioxide ($SiO_2$), silicon nitride (a-$Si_xN_yO_z$:H), aluminium oxide ($Al_xO_y$), tantalum oxide ($Ta_2O_5$), hafnium oxide ($HfO_2$), titanium dioxide ($TiO_2$), or zirconium dioxide ($ZrO_2$). For example, the second layer may comprise one or more of: an oxide, a nitride, an oxy-nitride, a carbide, or a carbo-nitride. A first layer comprising one or more of these compounds in examples may be applied, for example deposited, directly using methods such as sputter deposition or physical vapour deposition or can be formed by a chemical reaction during deposition from a precursor in a reaction chamber or in contact with the substrate, such as chemical vapour deposition, plasma-enhanced chemical vapour deposition or atomic layer deposition. For example, a first layer may be applied, for example deposited, upon introducing a gas or liquid precursor to a plasma. For example, silicon nitride may be deposited from argon (Ar), ammonia ($NH_3$), silane ($SiH_4$), nitrogen ($N_2$) and/or hydrogen ($H_2$), silicon dioxide may be deposited from hexamethyldisiloxane (HMDSO) liquid and oxygen ($O_2$) and aluminium oxide may be deposited from trimethylaluminium liquid (TMA) and Argon (Ar) gas. Example methods of applying the first layer are described in more detail below.

In examples, the second layer may comprise, for example be formed of, an organic material. An organic material is, in examples, any material or compound that includes carbon. For example, the second layer may comprise one or more of: poly(vinylidene fluoride) (—$(C_2H_2F_2)_n$—), poly(vinylidene fluoride) comprising titanium dioxide ($TiO_2$) particles, poly(vinylidene fluoride) comprising zirconium dioxide ($ZrO_2$) particles, poly(vinylidene fluoride-co-hexafluoropropylene) ((—$CH_2CF_2$—)$_x$(—$CF_2CF(CF_3)$—)$_y$), poly(vinylidene fluoride-co-hexafluoropropylene) comprising titanium dioxide particles, poly(vinylidene fluoride-co-hexafluoropropylene) comprising zirconium dioxide particles, poly(vinyl alcohol) (($CH_2CH(OH))_n$), poly(vinyl alcohol) comprising titanium dioxide particles, poly(vinyl alcohol) comprising zirconium dioxide particles, cyanoEthylPullulan ($C_6H_7O_2$(OR)$_3$)$_n$, where R=H or $CH_2CH_2CN$), cyanoEthylPullulan comprising titanium dioxide particles, cyanoEthylPullulan comprising zirconium dioxide particles, polyimide ($C_{22}H_{10}N_2O_5$), polyimide comprising titanium dioxide particles, polyimide comprising zirconium dioxide particles or an organosilicon-based material, for example an organosilicon-based thin film where an organosilicon-based material in examples is a compound comprising at least one carbon-silicon bond, as the skilled person will appreciate. The number of groups or atoms in the examples above and below are represented by x, y, z and n each being an integer. As the skilled person will appreciate, these materials are readily available commercially and, for example, may be formed from a solution or from a chemical reaction, such as a polymerisation reaction, during deposition, as will be described in more detail below for examples. In examples, the second layer may comprise one or more of: a thermoplastic polymer (for example a material which becomes fluid with plastic properties upon heating and hardens on cooling), a thermoset polymer (for example a material which is a fluid, for example with plastic properties, which hardens upon heating and/or exposure to radiation), or a co-polymer (for example a polymer formed of at least two different monomers). It is noted that where titanium dioxide or zirconium dioxide is referred to as comprised by a polymer material, that dioxide is for example dispersed within the polymer material.

In examples the first and second layers may further act as dielectric materials. In examples, the first layer comprises a material with a first dielectric constant which is one of substantially equal to or higher than 3.5 and the second layer comprises a material with a second dielectric constant which is one of substantially equal to or higher than 3.5, for example within plus or minus 10% of 3.5. Materials with a dielectric constant which is equal to or above 3.5 are considered in examples herein to be high dielectric constant materials. Providing first and second layers 46 and 47 which comprise high dielectric constant materials increases the capacitance of the electrowetting element and thus the capacitive coupling between the electrode and the first and second fluids. As explained above, relatively high capacitive coupling in examples allows a lower driving voltage to be applied to the electrode to obtain a desired display effect compared with an element with a lower capacitive coupling. This can therefore reduce the power consumption of the electrowetting element. In other examples, providing the first and/or second layers as thinly as feasibly possible may be used alternatively or in addition to increase the capacitance of the electrowetting element.

In further examples, the second layer comprises a material having a dielectric constant which is less than 3.5 and a material having a dielectric constant which is one of substantially equal to or higher than 3.5. For example, it may be difficult to apply, for example deposit, a thin layer of material with a high dielectric constant. In contrast, it can be easier to thinly apply low dielectric constant materials. Therefore, by forming the layer of a combination of a material with a low dielectric constant (in other words, with a dielectric constant which is less than 3.5) and a material with a high dielectric constant, the layer may be deposited with a higher overall capacitive coupling than would be achieved if the layer did not comprise the high dielectric constant material. In examples, the second layer comprises polyimide comprising titanium dioxide and/or zirconium dioxide particles, where in examples, as the skilled person will appreciate, polyimide is a low dielectric constant organic material and titanium dioxide and zirconium dioxide are high dielectric constant materials.

In examples, the support plate 5 may further comprise a fluid contact layer such as contact layer 15 disposed on the second layer between the second layer and the support plate surface, the contact layer 15 having a fluid contact layer optical thickness that is substantially equal to an odd multiple of a quarter of the reference wavelength. For example, a support plate may include an insulating layer 13 comprise the first, second and third layers 46, 47, and 48 depicted in FIG. 4, with the third layer 48 being the fluid contact layer.

The support plate 5 may further include at least one additional layer pair, each additional layer pair including a first additional layer and a second additional layer. For example, in examples the support plate may further include a first additional layer 48 disposed between the second layer 47 and the support plate surface 14. The second additional layer 49 may be disposed on the first additional layer 48 between the first additional layer 48 and support plate surface.

The first additional layer 48 is similar to the first layer 46; features described with reference to the first layer 46 may also be present in the first additional layer 48. The second additional layer 49 is similar to the second layer 47 described above; features described with reference to the second layer 47 may also be present in the second additional layer 49. In further examples, the fluid contact layer may be disposed on the second additional layer 49 between the second additional layer 49 and the support plate surface 14. For example, the fluid contact layer may be fifth layer 50. In examples, layers 46, 47, 48, and 49 may comprise different materials, different refractive indices, or different geometric thicknesses, as will be understood by those of skill in the art.

By adding at least one additional layer pair to the first layer 46 and second layer 47, the reflectance of the support plate may be further improved. In addition, the target wavelength band may be further narrowed and defined. For example, support plate 5 may include 10 or more additional layer pairs.

Reflectance of the support plate 5 may be detected using a variety of methods, as the skilled person will appreciate. For example, a light ray may be directed from a calibrated light source towards an electrowetting element or a support plate surface, with the reflected light measured via photo detector. Layer thickness may be further determined using scanning electron microscopy (SEM) to obtain an image of the layer. The refractive index of a layer may also be determined using an ellipsometer.

In the example of FIG. 4, the stack of layers 46, 47, 48, 49, and 50 and the electrode 17 of the support plate are disposed within support plate stack 5. For example, the electrode 17 may contact substrate 7a and at least one of the layers 46, 46, 48, 49, or 50 may contact one of the first or second fluids. The plurality of layers 46, 47, 48, 49, and 50 of FIG. 4 may form or be part of the barrier layer 16 and/or contact layer 15 of FIGS. 1 and 2 which, as described above, form part of the first support plate 5.

In examples, the fluid contact layer may comprise more than 80%, more than 90%, more than 95%, approximately 100% or 100% of a hydrophobic material by weight or by volume. The remainder of the fluid contact layer may for example be formed of a different material than a hydrophobic material. In examples in which the support plate includes a hydrophobic layer, the hydrophobic layer may be a layer of the plurality of a layers or a separate layer (as in the example of FIGS. 1 and 2). It is to be appreciated that, in further examples, the plurality of layers of FIG. 4 may be part of a support plate which differs from that described with reference to FIGS. 1 and 2, as will be described in more detail below.

As is known, an electrowetting element includes a capacitor; a first plate of the capacitor is the first electrode and a second plate of the capacitor is the second fluid, which is provided with electric charge via the second electrode. Therefore, any combination of the plurality of layers 46, 47, 48, 49, and 50 between the first electrode and the second fluid may form a dielectric layer in examples. A capacitance of the electrowetting element may thus depend on properties of any combination of the plurality of layers 46, 47, 48, 49, and 50.

In examples, providing a plurality of layers with certain properties allows a relatively high capacitive coupling between the electrode and the fluids to be obtained. This can reduce the driving voltage which is applied to the electrodes to obtain a desired display effect compared with an element with a lower capacitive coupling. This can therefore reduce the power consumption of the electrowetting element. By combining the capacitive features with the enhanced reflectance features of layer stack of support plate 5, the layer stack may therefore help improve both the capacitance and the brightness and efficiency of the electrowetting element. This may therefore facilitate improved performance of the electrowetting element while also increasing the performance and lifetime of an electrowetting display device. Moreover, combining the enhanced reflectance properties and dielectric properties, functions may provide an electrowetting element that may be manufactured straightforwardly and cost effectively.

The above examples are to be understood as illustrative examples. Further examples are envisaged. For example, examples are described above with the first layer disposed on a reflective surface such as a reflective surface of an electrode. In other examples the first layer may be a layer positioned between the reflective surface and the support plate surface, with at least one further layer between the reflective surface and the first layer.

Further, for example, examples of a support plate are described above for a reflective electrowetting element. It is envisaged that such a support plate may in further examples comprise at least one aperture or hole, such as a slit which may be rectangular of another suitable shape, through the support plate such that light may be transmitted through the support plate from a backlight to the viewing side. Such examples would be referred to as a transflective type of electrowetting element, as the display effect is provided by a combination of light reflected by the support plate and light transmitted through the support plate via the at least one aperture or hole. Thus, the benefits of the support plate examples described above in relation to improved brightness may be combined with benefits from transmitting light from a backlight, as the skilled person would appreciate.

Figure 5:
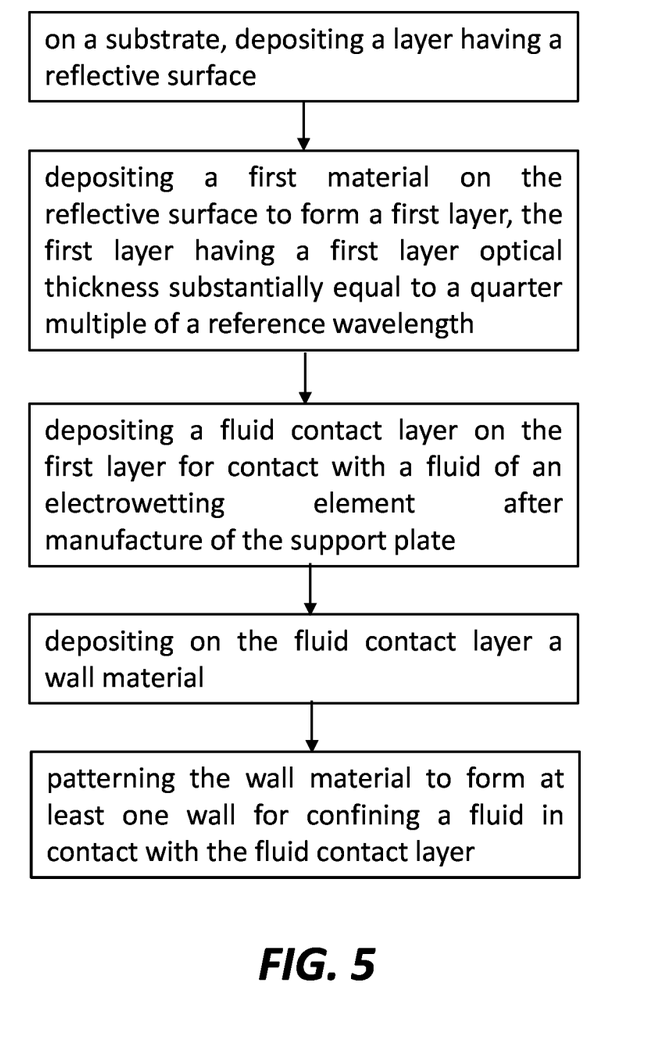
FIG. 5 is a flow diagram relating to examples of a method of manufacturing an electrowetting element.

Examples also relate to a method of manufacturing at least part of a support plate of an electrowetting element, as shown in FIG. 5. Further steps, not shown in FIG. 5, may be included to manufacture a support plate. The example methods of FIG. 5 may be used to manufacture a support plate such as the first support plate 5 of FIG. 1 or FIG. 4.

Example methods include applying, for example depositing a reflective surface on a substrate (either directly on or with other layers between the reflective surface and the substrate) for example, and depositing a first material between the reflective surface and a support plate surface to form a first layer.

For example, where the reflective surface is formed of aluminium, a CVD or PVD technique may be used to deposit the reflective surface material. A first material is applied, for example deposited, on the reflective surface to form a layer such as the first layer 46 referred to previously with reference to FIG. 4. In example methods, a material being applied on an underlying layer may be applied directly on, and therefore in contact with, the underlying layer. In other examples, the material may be applied indirectly on the underlying layer, with a further layer between the material and the underlying layer.

In further examples, the reflective surface may be a surface of an electrode material positioned between the reflective surface and a first layer to form an electrode. In such instances, a CVD or PVD technique may be used to deposit the electrode material to form both the electrode and the reflective surface.

In further examples according to FIG. 5, an electrode material may be deposited on the reflective surface between the reflective surface and the first layer to form the electrode.

Example methods may further include applying an electrode precursor layer on a substrate, which is an underlying layer to the electrode in the support plate. The electrode precursor layer may be applied, for example deposited, using for example chemical or physical vapour deposition (CVD or PVD) for example sputter deposition or electron beam evaporation where temperature, pressure and power are controlled appropriately, as would be understood by the skilled person. Further layers may also be applied, for example deposited, and patterned to form circuitry for controlling the display elements. The electrode precursor layer is patterned to form the electrode of for example ITO using an appropriate patterning technique as the skilled person would understand. An example of such a patterning technique involves masking areas of the electrode precursor layer to remain after the patterning with a photoresist material, using a photo lithography technique to harden the photoresist in areas where the at least one electrode is to be formed, removing the un-hardened photoresist and then etching the applied/deposited metal not covered by the photoresist, for example an acidic etching solution.

The example methods of manufacture of FIG. 5 include applying a first material to form a first layer on the electrode. This layer is for example the first layer 46 referred to herein. The layer may, in examples, comprise at least one inorganic material such as silicon oxide, silicon nitride, aluminium oxide, tantalum oxide, hafnium oxide, titanium dioxide, or zirconium dioxide. A dry process, for example in which the material is applied, for example deposited, on the layer in a form other than liquid form, for example as a vapour, solid or as solid particles, may be used. Such a dry process may involve one or more of: a chemical vapour deposition process, a plasma enhanced chemical vapour deposition process, or an atomic layer deposition process. In chemical vapour deposition, a substrate may be exposed to one or more volatile precursors in the form of vapours which react and/or decompose on the substrate to deposit the material on the substrate. Plasma enhanced chemical vapour deposition is similar to chemical vapour deposition but involves forming a plasma of the one or more precursors, for example by filling a space between two electrodes with the one or more precursors in the form of vapours and then applying a radio frequency using either alternating current or direct current discharge between two electrodes. In an atomic layer deposition process, precursors react with a surface of a material sequentially, thereby depositing a layer which is for example a dense layer.

The second layer which is formed for example by applying, for example depositing, a second layer material on the first layer in some examples, comprises at least one organic material such as poly(vinylidene fluoride), poly(vinylidene fluoride) comprising titanium dioxide particles, poly(vinylidene fluoride) comprising zirconium dioxide particles, poly(vinylidene fluoride-co-hexafluoropropylene), poly(vinylidene fluoride-co-hexafluoropropylene) comprising titanium dioxide particles, poly(vinylidene fluoride-co-hexafluoropropylene) comprising zirconium dioxide particles, poly(vinyl alcohol), poly(vinyl alcohol) comprising titanium dioxide particles, poly(vinyl alcohol) comprising zirconium dioxide particles, cyanoEthylPullulan, cyanoEthylPullulan comprising titanium dioxide particles, cyanoEthylPullulan comprising zirconium dioxide particles, polyimide, polyimide comprising titanium dioxide particles, polyimide comprising zirconium dioxide particles or an organosilicon-based material. In examples, the material may be applied, for example deposited, on the first layer as a liquid, in other words using a wet process such as one or more of a slot die coating process, a spincoating process or a flexoprinting process. Slot die coating involves applying a liquid through a slot onto an underlying layer, which may be passed underneath the slot by rollers for example. In spincoating, a liquid material is applied, for example deposited, at or close to the centre of an underlying layer which is then rotated to spread the liquid material across the underlying layer by centrifugal force. In flexoprinting, a layer of a liquid material is transferred onto a roller or plate with a desired pattern. A scraper, known in the art as a "doctor blade", removes an excess of the liquid material from the roller. Then the substrate is sandwiched between the roller or plate and an impression cylinder to transfer the liquid material to an underlying layer. The liquid material may then be dried.

Applying the material as part of a wet process may be more straightforward than using a dry process (in other words with the material applied, for example deposited, as a vapour or solid) and may, for example, allow the material to be applied, for example deposited, as a thinner layer and/or with fewer pinholes than a dry process. In an example, the first layer is formed using plasma enhanced chemical vapour deposition, for example from argon, ammonia ($NH_3$) and silane ($SiH_4$), and the second layer is formed using slot die coating.

In other examples, a dry process, for example a vacuum technique such as an initiated chemical vapour deposition process may be used to deposit a material on the first layer to form a layer such as the second layer described above. When a vacuum technique is used, a monomer and an initiator are for example first vaporised and then injected into a deposition chamber where the material is deposited on a substrate.

In some examples, using plasma enhanced chemical vapour deposition to form the first layer and initiated chemical vapour deposition to form the second layer, both the first and second layers can be deposited in a vacuum in examples. The combination of these two deposition methods means that both the first and second layers can be deposited using the same system, avoiding surface contamination during transport between a vacuum and a slot die coater, for example.

In examples, material for forming one or more additional layers, for example the third layer 48 or the additional first layer described above with reference to FIG. 4, may be applied, for example deposited, on the second layer 47. For example, material may be applied, for example deposited, to form a plurality of layers which alternate between a layer comprising a higher refractive index and a layer comprising a lower refractive index. For determining the required thickness of each layer, and the number of layers, a computer modelling technique may be used to for example optimise the constructive interference for a given stack with different thicknesses and refractive indices, and with a different number of layers.

The methods of FIG. 5 may additionally include applying a layer comprising hydrophobic material on any of first layer 46, second layer 47, third layer 48, fourth layer 49, or further layers such as the first additional layer, and the second additional layer described above. The layer comprising hydrophobic material may be applied, for example deposited, using for example a slot die coating or spincoating process, as the skilled person would appreciate.

Subsequent to the steps described above, wall material may be applied, for example deposited, on the fluid contact layer, either directly or indirectly. The wall material may then be patterned to form at least one wall for confining the first fluid to a display area of the second support plate. The wall material may be SU8 and the patterning may therefore be performed using an appropriate photoresist technique as the skilled person will readily understand.

Figure 6:
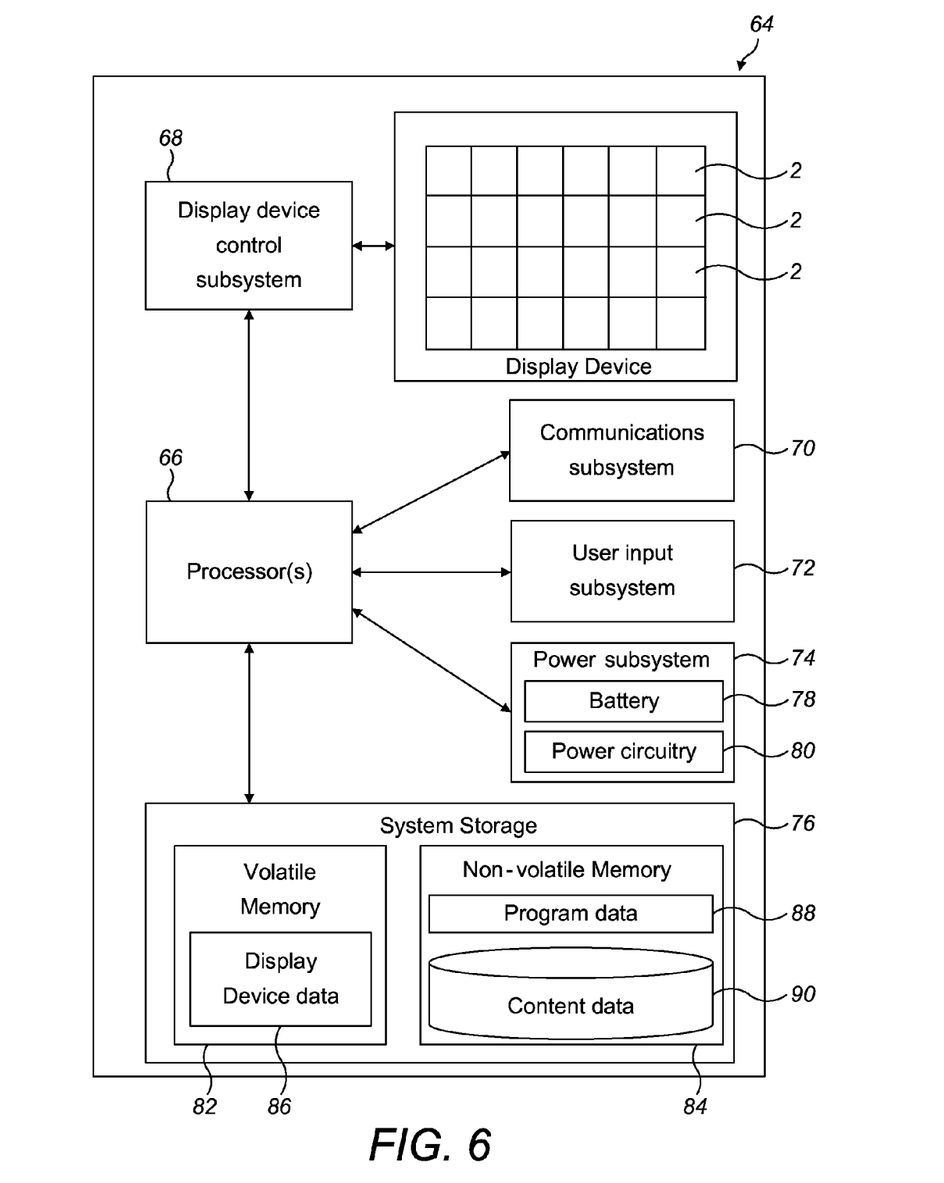
FIG. 6 shows a schematic system diagram of an example apparatus including an electrowetting display device.

FIG. 6 shows schematically a system diagram of an example system, for example apparatus 64, comprising an electrowetting display device such as the electrowetting display device 1 described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device 1. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting display element driver components, for use in applying a voltage to any of the electrowetting display elements, to address such display elements separately. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 6, the volatile memory 82 stores for example display device data 86 which is indicative of display effects to be provided by the display device 1. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
a first fluid;
a second fluid immiscible with the first fluid; and
a support plate having a support plate surface, at least one of the first fluid or the second fluid in contact with the support plate surface, the support plate comprising:
an electrode configured to apply a voltage to control a configuration of the first fluid and the second fluid;
a first layer comprising an inorganic material, the first layer positioned between a reflective surface and the support plate surface, the first layer having a first layer optical thickness substantially equal to a quarter multiple of a reference wavelength; and
a second layer comprising an organic material, the second layer disposed on the first layer between the first layer and the support plate surface.

2. The electrowetting element of claim 1, wherein the reflective surface is a surface of the electrode.

3. The electrowetting element of claim 1, wherein the first layer comprises the electrode.

4. The electrowetting element of claim 1, wherein the reference wavelength is between 200 nm and 800 nm.

5. The electrowetting element of claim 1, wherein the first layer contacts the reflective surface and at least one of: the first layer or the inorganic material comprises a material having a first refractive index less than 1.6 for radiation having the reference wavelength.

6. The electrowetting element of claim 1, wherein the electrode or a reflective layer comprises the reflective surface and comprises at least one of: aluminum, silver, gold, copper, nickel, platinum, rhodium, lanthanum, or silicon.

7. The electrowetting element of claim 1, wherein the first layer comprises at least one of: silicon oxide, silicon nitride, aluminum oxide, tantalum oxide, hafnium oxide, titanium dioxide, or zirconium dioxide.

8. The electrowetting element of claim 1, wherein the second layer has a second layer optical thickness substantially equal to a quarter multiple of the reference wavelength.

9. The electrowetting element of claim 1, wherein at least one of: the first layer or the inorganic material comprises a material having a first layer refractive index and at least one of: the second layer or the organic material comprises a material having a second layer refractive index greater than the first layer refractive index.

10. The electrowetting element of claim 9, wherein the second layer refractive index is at least 0.3 greater than the first layer refractive index.

11. The electrowetting element of claim 1, wherein the second layer comprises at least one of: poly(vinylidene fluoride), poly(vinylidene fluoride) comprising titanium dioxide particles, poly(vinylidene fluoride) comprising zirconium dioxide particles, poly(vinylidene fluoride-co-hexafluoropropylene), poly(vinylidene fluoride-co-hexafluoropropylene) comprising titanium dioxide particles, poly(vinylidene fluoride-co-hexafluoropropylene) comprising zirconium dioxide particles, poly(vinyl alcohol), poly(vinyl alcohol) comprising titanium dioxide particles, poly(vinyl alcohol) comprising zirconium dioxide particles, cyanoEthylPullulan, cyanoEthylPullulan comprising titanium dioxide particles, cyanoEthylPullulan comprising zirconium dioxide particles, polyimide, polyimide comprising titanium dioxide particles, polyimide comprising zirconium dioxide particles or an organosilicon-based material.

12. The electrowetting element according to claim 1, wherein at least one of: the first layer or the inorganic material comprises a material with a first dielectric constant which is at least 3.5; and at least one of: the second layer or the organic material comprises a material with a second dielectric constant which is at least 3.5.

13. The electrowetting element of claim 1, wherein the support plate comprises:
a fluid contact layer comprising the support plate surface, the fluid contact layer having a fluid contact layer optical thickness that is substantially equal to an odd multiple of a quarter of the reference wavelength.

14. The electrowetting element of claim 1, wherein the support plate comprises at least one additional layer pair, the at least one additional layer pair comprising:
a first additional layer disposed between the second layer and the support plate surface, the first additional layer:
having a first additional layer optical thickness substantially equal to a quarter multiple of the reference wavelength, and
comprising a material having a first additional layer refractive index; and a second additional layer disposed on the first additional layer between the first additional layer and the support plate surface, the second additional layer:

having a second additional layer optical thickness substantially equal to a quarter multiple of the reference wavelength, and comprising a material having a second additional layer refractive index being higher than the first additional layer refractive index.

15. The electrowetting element according to claim 1, wherein the first layer optical thickness is between: a quarter multiple of the reference wavelength minus an eighth of the reference wavelength, and a quarter multiple of the reference wavelength plus an eighth of the reference wavelength.

16. The electrowetting element according to claim 1, wherein the first layer optical thickness is between approximately 65 nm and approximately 270 nm.

17. The electrowetting element according to claim 1, wherein at least one of: the second layer or the organic material comprises a material having a dielectric constant less than 3.5 and a material having a dielectric constant which is one of: substantially equal to 3.5, or higher than 3.5.

18. The electrowetting element according to claim 1, wherein the reference wavelength is within a target wavelength band, the target wavelength band corresponding with a particular color, such that the support plate is arranged to act as a color filter for the particular color.

19. The electrowetting element according to claim 1, wherein the reflective surface is a surface of a reflective layer positioned between a substrate and the electrode.

* * * * *